United States Patent [19]

Schwärzler

[11] 3,967,561
[45] July 6, 1976

[54] LINEAR-INDUCTION MOTOR ESPECIALLY FOR HIGH-SPEED SUSPENSION VEHICLES

[75] Inventor: Peter Schwärzler, Furstenfeldbruck, Germany

[73] Assignee: Krauss-Maffei Aktiengesellschaft, Munich, Germany

[22] Filed: Feb. 3, 1975

[21] Appl. No.: 546,748

[30] Foreign Application Priority Data
Feb. 5, 1974 Germany............................ 2405309

[52] U.S. Cl............................ 104/148 LM; 310/13
[51] Int. Cl.² .................... B61B 13/08; H02K 41/04
[58] Field of Search ............ 104/148 LM, 148 MS; 310/12, 13; 308/10

[56] References Cited
UNITED STATES PATENTS

| | | | |
|---|---|---|---|
| 3,644,762 | 2/1972 | Eastham | 104/148 LM X |
| 3,802,349 | 4/1974 | Guimbal | 104/148 LM |
| 3,850,108 | 11/1974 | Winkle | 104/148 LM X |

Primary Examiner—Trygve M. Blix
Assistant Examiner—Barry L. Kelmachter
Attorney, Agent, or Firm—Karl F. Ross; Herbert Dubno

[57] ABSTRACT

A linear-induction motor for use on a magnetic-suspension vehicle which is supported by suspension electromagnets from a track having an armature rail cooperating with the electromagnets and with a reaction rail cooperating with the flat linear-induction motor. The stator, carried by the vehicle, has a stator core and comb lamination stacks in which the laminations of the stack are perpendicular to the direction in which the stator extends and to the substantially flat reaction rail.

9 Claims, 4 Drawing Figures

LINEAR-INDUCTION MOTOR ESPECIALLY FOR HIGH-SPEED SUSPENSION VEHICLES

CROSS-REFERENCE TO RELATED APPLICATIONS

The present application is related to my copending application Ser. No. 425,615 filed Dec. 17, 1973 (U.S. Pat. No. 3,911,828) and to the prior applications mentioned therein, namely, Ser. No. 324,135 filed Jan. 16, 1973 (U.S. Pat. No. 3,842,747) and entitled ELECTROMAGNETIC SUSPENSION AND GUIDANCE SYSTEM for vehicles adapted to switch tracks and application Ser. No. 324,151 also filed Jan. 16, 1973 (U.S. Pat. No. 3,842,749) and entitled TRANSPORT SYSTEM WITH MAGNETIC SUSPENSION VEHICLES. These applications, in turn, refer to commonly assigned applications Ser. Nos. 268,132 (U.S. Pat. No. 3,809,022) and 268,133 (U.S. Pat. No. 3,797,403), both filed June 30, 1972, to commonly assigned copending applications Ser. No. 280,073 (U.S. Pat. No. 3,780,668) and 280,074 (U.S. Pat. No. 3,842,748), both filed Aug. 11, 1972, and to commonly assigned copending application Ser. No. 292,638 filed Sept. 27, 1972 (U.S. Pat. No. 3,804,997).

FIELD OF THE INVENTION

The present invention relates to linear-induction motors of high-speed drive systems and, more particularly, to a linear-induction motor for a magnetic-suspension or magnetic-levitation vehicle. The invention also relates to magnetic-suspension vehicles with improved drive and suspension means.

BACKGROUND OF THE INVENTION

With the increasing interest in high-speed vehicles for inter-urban, intra-urban and rural-urban transport of passengers and freight, considerable attention has been directed to avoiding frictional drive systems between the vehicle and a track to reduce the friction forces between them.

To this end, as described in the earlier applications mentioned above, such vehicles have been suspended by magnetic forces from the track which can be provided on opposite sides with a pair of substantially continuous armature rails. The latter are juxtaposed with rows of suspension electromagnets on each side of the vehicle and a substantially constant suspension gap is maintained between the cores of the electromagnets and the armature rails by suitable circuitry. For lateral guidance of the vehicle on the track, the suspension electromagnets and armature rails may be shaped as described in the aforementioned copending applications or additional laterally effective guide electromagnets and corresponding armature rails may be provided.

Such suspension and guide systems avoid direct contact of the vehicle and the track except for wipers or the like which may be provided to enable the vehicle to pick up electric current from the track.

Similarly it has been attempted to replace the rotary drive motors of conventional vehicles with linear-induction motors designed to apply a propelling force to the vehicle without moving parts other than the stator carried by the vehicle body and a reaction rail provided on the track. While the present invention is concerned primarily with linear-induction motors in magnetic-suspension or magnetic-levitation systems, it should be noted that the principles here disclosed may be equally applicable to other vehicle-drive arrangements.

Linear-induction motors of the type described operate in accordance with eddy-current principles whereby the magnetic field bridging the stator and the reaction rail induces an eddy-current in a conductive layer of the rail or in the entire rail. This eddy-current reacts with the magnetic field and, by causing the field to move along the stator, i.e. by the use of a plurality of coils energized in a rotary-field multiphase system, a linear force is produced between the stator and the rail which, since the rail is fixed, propels the vehicle along the track.

In earlier linear-induction motor constructions, the reaction rail has been of U figuration with a channel open to one side to receive the stator and a plurality of annular windings spaced therealong, the windings or coils lying in places perpendicular to the direction of displacement and to the U section rails. The coils were mounted in grooves of a core structure of ferromagnetic material so that the upper and lower flanks of the stator, active surfaces are formed which interact with rails provided along the inner flanks of the shanks of the U. These layers are conductive to generate the aforementioned eddy-currents.

As noted in application Ser. No. 425,615, the use of such a linear-induction motor in high-speed magnetic-suspension vehicles is not practical because the mechanical characteristics of the motor prevented it from being used at the desired high speeds, nor can the motors be constructed to have a capacity in in the magawatt range.

The improvement described in application Ser. No. 425,615 overcame these disadvantages by providing a linear-induction motor, especially for a magnetic-levitation vehicle, which comprises a U-section channel or rail coated or clad along three of its internal surfaces with a reactive layer of electrically conductive material and receiving the stator of the motor which was cantilevered from the vehicle. The stator comprised a plurality of axially spaced annular coils (ring windings) energized by a multiphase source. The active magnetic mass of this stator included a core surrounded by the coils and extending into the channel or rail while being subdivided along a longitudinal plane into two core-sheet stacks with a lamellae of the two stacks being oriented in different mutually orthogonal directions. The two stacks or packets were jointed together along the longitudinal place into a rigid core structure.

An earlier linear-induction motor had stator windings lying only in places at the back of the stator core or lamination stacks and was characterized by high leakage inductance and low power. Increase in the stator current to increase the power led to comparatively high air-gap induction losses.

A somewhat more effective linear-induction motor was described in U.S. Pat. No. 3,333,124 which has a number of annular windings which are arranged in succession in the longitudinal direction of the motor and between each two such windings there is provided a rectangular stator lamination stack.

The stator lamination stacks are attached to an assembly plate extending in the longitudinal direction of the motor.

In such prior-art constructions the pole surfaces of the stator in comparison with the pole surfaces of the reaction rail are relatively small so that the magnetic-flux densities in the stator poles are relatively high, especially with high electrical power, thereby increasing the air-gap induction and resulting in power losses.

Accordingly, the prior art linear-induction motors are of relatively lower efficiency.

In addition, the mechanical structure of prior art linear-induction motors has left much to be desired, especially where the individual stator lamination stacks are attached to an assembly plate by three comparatively small end surfaces so that the center of gravity of the stator lamination stacks is spaced comparatively far from the point of support. Such systems are not suitable for the propulsion of high-speed vehicles and especially high-speed magnetic-suspension vehicles.

OBJECTS OF THE INVENTION

The principal object of the present invention is to provide an improved linear-induction motor which avoids the aforementioned disadvantages and is of increased operating efficiency and greater mechanical strength and suffers reduced power losses than earlier linear-induction motors without material increase in motor weight.

It is also an object of this invention to provide a linear-induction motor which improves upon the systems described in the aforementioned copending application.

SUMMARY OF THE INVENTION

These objects and other which will become apparent thereafter are attained, in accordance with the present invention, in a linear-induction motor, especially for a magnetic-suspension vehicle, which comprises a stator core consisting of a stack of core laminations which extend in planes parallel to the direction of vehicle travel, i.e. aligned with the longitudinal direction of the motor, and perpendicular to the plane of the conductive surface of the reaction rail with which the stator cooperates. The coil windings lie in planes perpendicular to the direction of travel and to the reaction rail and are spaced apart along the elongated stator core in accordance with the principles set forth in the last mentioned copending application (Ser. No. 425,615).

The stator windings each extend all around and completely encompass the stator core and the reaction rail comprises a flat body of ferromagnetic material carrying at least a conductive layer capable of inducing eddy-currents.

There are provided lamination stacks of a length greater than the width of the stator core (as measured transversely to the direction of travel) and to the longitudinal axis, in contact with the stator stack and in abutting relationship therewith over the entire width of this stack juxtaposed with the reaction rail. A plurality of such lamination stacks, whose laminations lie in planes perpendicular to the axis and to the reaction rail are provided hence these lamination stacks are termed "comb lamination stacks".

Since these comb lamination stacks have a length greater than the transverse width of the stator core, and the ferromagnetic member of the reaction rail may have a width corresponding to the length of the comb lamination stacks, it will be apparent that the magnetic interaction between the stators and the reaction rail is increased and losses are reduced.

According to another feature of the invention, each of the comb lamination stacks is retained against the stator core by a tension bow or yoke which extends around the other three sides of the stator core and has a bight lying along the top of the stator core and a pair of shanks laterally straddling same. These shanks are connected to the ends of the respective comb lamination stack to draw the latter against the surface of the stator core juxtaposed with the reaction rails.

According to another feature of the invention, the stator core is formed with a transverse recess between each pair of windings and opening in the direction of the reaction rail, the respective comb lamination stacks being received in each such recess.

The U-shaped tension bows or yokes are broadened or widened (enlarged) adjacent their free ends to the dimensions of the comb lamination stack at the ends thereof projecting laterally beyond the stator and the juxtaposed surfaces of these projecting ends of the core lamination stacks and the ends of the tension yoke are inclined to provide a contact surface oblique to the plane of the reaction rail. The angle of inclination of these surfaces is preferably about 45° to the plane of the reaction rail, the plane of the surface of the stator stack juxtaposed therewith and to horizontal and vertical planes when the reaction rail is substantially horizontal.

Still another feature of the present invention provides that the length of the comb lamination stacks is at least 1.5 times the width of the stator core.

Advantageously, the tension yokes or bows are of a metallic material and project outwardly from the stator stacks beyond the annular windings, a metallic cover or housing being provided upon these yokes or bows and extending in the direction of the longitudinal axis of the vehicle. Each pair of U-shaped tension bows or yokes and the respective portion of the housing between them (encircling three sides of the intervening windings) form a damping cage. The tension bows are all laterally interconnected by means of longitudinal conductors fixed to their free ends and to the housing along the margins thereof turned toward the reaction rail.

The damping cages can be provided with additional stiffening elements which, together with the conductors which also act as reinforcing bars, increase the mechanical strength of the stator assembly.

An important aspect of the present invention resides in providing the reaction rails as the upper member of a U-shaped aramture rail for a magnetically suspended and guided vehicle in which the armature rail cooperates with a row of electromagnets upon the vehicle. In this case the reaction rail is mechanically stiffened by the U-shaped armature rail or contributes to the mechanical support of the latter.

As described, the essential feature of the invention is that the magnetically active stator width is greater than that of the stator core and, by comparison with linear-induction motors of the same active motor width, the stator core can be reduced in size and the resulting reduction in motor density permits the weight of the motor to be reduced. The reduction ins size of the windings results in lower ohmic losses. Such a decrease in weight is important in magnetic-suspension vehicle applications since it enables the payload of the vehicle to be increased.

The improved motor, by comparison with motors of the same stator core width, has a substantially increased magnetically active motor surface so that with the same magnetic flux, there is a smaller air gap induction, reduced reactive power loss and increased electrical efficiency. Because of the reduction of the air gap induction there is less spurious transverse magnetic force and fewer difficulties in suspending and guiding the vehicle.

In accordance with the invention, moreover, the internal diameter of the windings can be made smaller than the height of the stator core so that, by comparison with motors having annular windings of the same internal diameter, the stator core height is reduced and there is a further saving in weight.

The damping cages enclose each of the windings at least along three sides and have the advantage of substantially reducing magnetic leakage losses, thereby increasing electrical efficiency and reducing the noise level of the motor. The supporting structure for the damping cages provies a simple and convenient way in which the stator assembly can be efficiently secured to the vehicle.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 3:
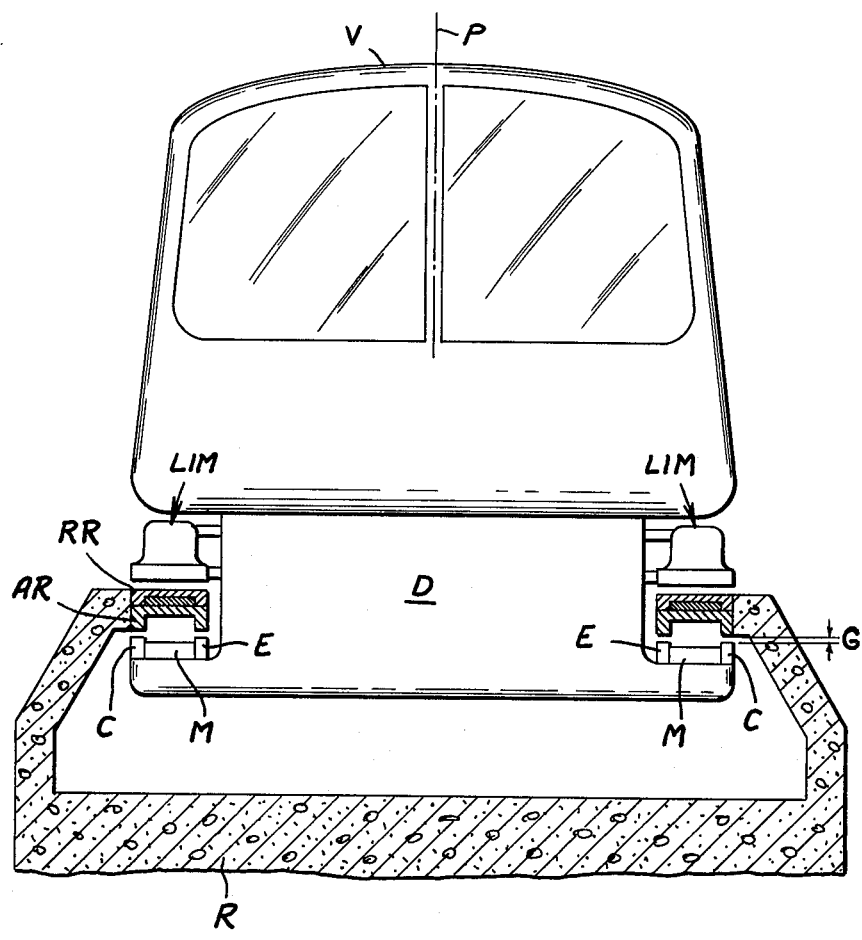
FIG. 3 is a cross section through a track system showing the motor as applied to a magnetic suspension vehicle.

Referring first to the system illustrated in FIG. 3, it will be seen that the Vehicle V displaceable along the track R has depending structure D on whose laterally extending arms are carried suspension electromagnets E with cores C and magnetic coils M. The suspension electromagnets are provided symmetrically on opposite sides of a longitudinal median plane P through the system. On each side, moreover, the vehicle is provided with linear-induction motors LIM which cooperate with reaction rails RR bonded to inverted-U section armature rails AR which coact with the suspension and guide electromagnets to support the vehicle. As a result, the vehicle is suspended by a gap G which can be controlled by any of the means described in the aforementioned copending applications. The particular construction of the electromagnets and the armature rails, the use of main and auxiliary electromagnets to permit switching and the like may all be in accordance with the principles described in the aforementioned copending applications.

Figure 1:
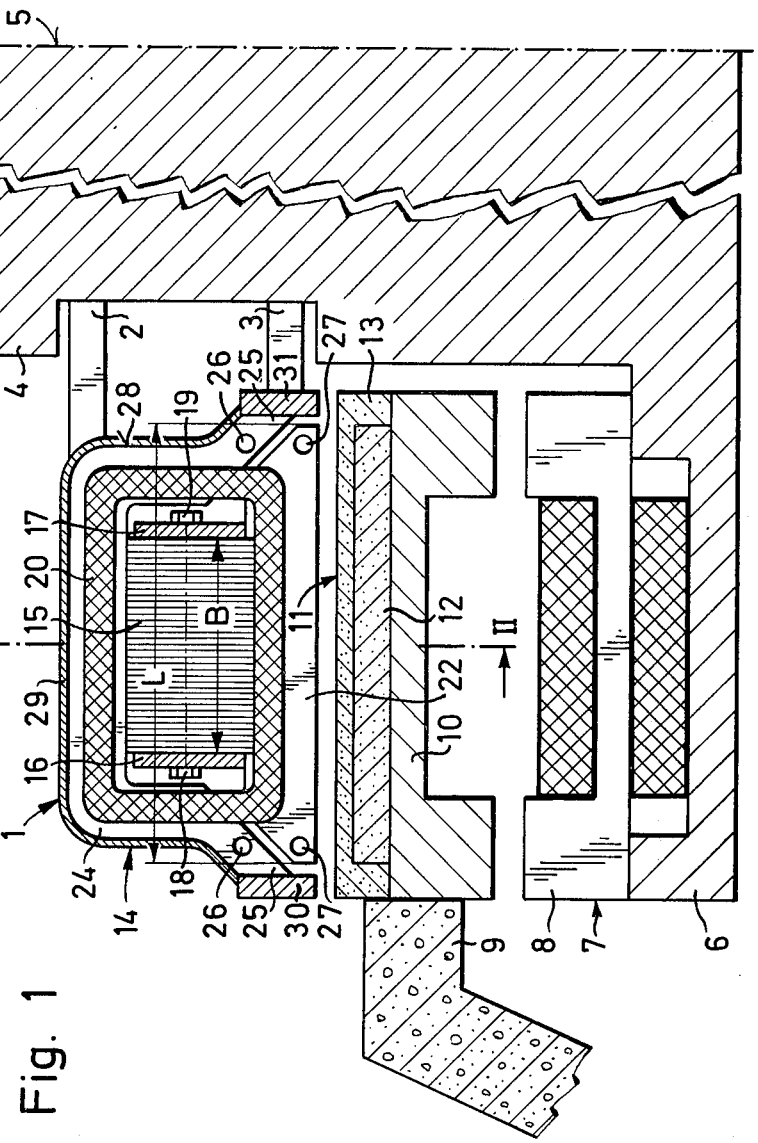
FIG. 1 is a cross section through a linear-induction motor in accordance with the invention at one side of a magnetic suspension vehicle.
Figure 2:
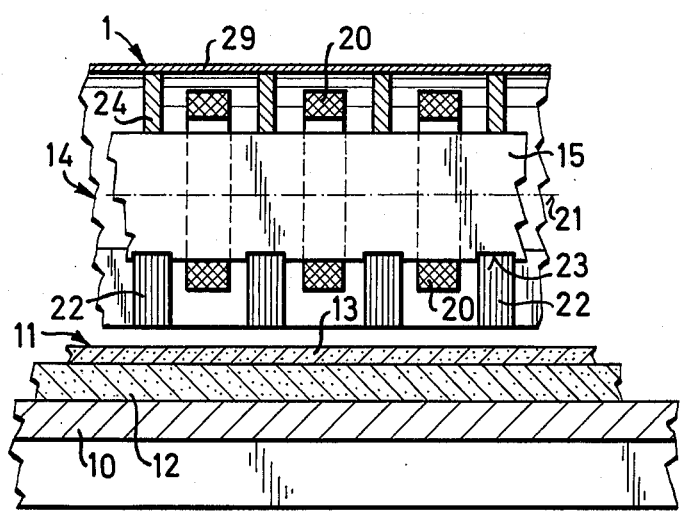
FIG. 2 is a longitudinal section, partly in diagrammatic form, fragmentarily showing the motor of FIG. 1.
Figure 4:
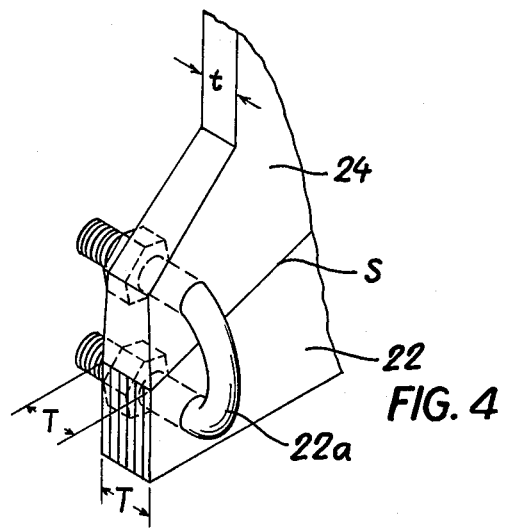
FIG. 4 is a perspective view showing a detail of the attachment of the comb lamination stacks to the tension yokes of the stator of FIGS. 1 and 2.

In FIGS. 1, 2 and 4 I show details of the linear-induction motor of FIG. 3 and the supporting structure of the vehicle. More particularly, the linear-induction motor 1 is attached by support brackets 2 and 3 to a longitudinal side of the structure 4 of the magnetically suspended vehicle.

The structure 4 is provided with a pair of rectangularly outwardly extending arms 6 disposed mirror-symmetrically with respect to the vehicle axis 5 of the vehicle, (corresponding to plane P).

Each arm 6 has a horizontal section underlying a suspending and guiding magnetic 7 whose upwardly open vehicle-section magnetic core carries the magnetic coil and cooperates with a downwardly open U-section armature rail 10 attached to a track portion as to produce the magnetic field suspending and guiding the vehicle 4.

The reaction rail 11 is fixed to the back of the armature rail 10 and comprises a flat ferromagnetic body 12 and an electrically conductive layer or coating 13 applied to this body. The ferromagnetic body 12 has a transverse width L and the entire reaction rail 11 extends continuously along the armature rail 10.

The stator 14 of the linear-induction motor 1 has a laminated stator core 15 whose laminations are aligned with the longitudinal direction of the motor and are pressed together between a pair of lateral compression plates 16 and 17 by tension bolts 18, 19 traversing the stator core stack. This longitudinally extending stator stack 15 is encircled by a number of windings 20 lying along the longitudinal axis 21. This part of the assembly corresponds to that described in the last mentioned copending application (Ser. No. 425,615) and operates in the usual manner.

In accordance with the present invention, however, there are additionally provided elongated comb lamination stacks 22 which are pressed against the underside of the stator core stack 15, i.e. against the surface of the latter which is juxtaposed with the reaction 11. These comb lamination stacks have a length L which is equal to the width of the respective portion 12 of the rail 11 and is substantially greater than the width B of the stator core stack 15.

Preferably the length L is approximately twice the width B and is at least 1.5 time the latter.

As can be seen from FIG. 2, the laminations of the comb lamination stacks 22 lie perpendicular to the direction of travel and to the axis 21 and to the reaction rails 11. The comb lamination stacks 22 interdigitate with annular windings 20 and are each received in a shallow depression or recess 23 in the stator core 15 to prevent displacement of the comb lamination stacks in the direction of the axis 21.

The magnetic flux produced by the annular windings 20 passes from the stator core 15 into the comb lamination stacks 22 and, because of the effective broadening of the stator core by these comb lamination stacks, there is a reduction in the magnetic flux density between the stator and the reaction rail and hence a reduced induction in the air gap between them.

In order to press the comb lamination stacks 22 against the underside of the stator core stack 15, each comb lamination stack 22 is provided with a U-shaped tension bow or yoke 24 which straddles the two lateral surfaces of the stator core stack 15 and extends across the top thereof. Hence the free ends 25 of each yoke 24 reaches toward the free ends of the respective comb lamination stacks 22.

The free end 25 of each yoke is broadened out from a thickness $t$ to the thickness T (FIG. 4) and to the length L (FIG. 1) so that, together with the portions of the comb lamination stack 22 extending beyond the stator core width B, flanges are formed. The contact surfaces S between the comb lamination stacks 22 and the corresponding free ends 25 of the yokes 24 are inclined, preferably at an angle of 45° to the reaction rail 11, to permit passage with minimum leakage of the flux induced in the yoke 24 into the respective comb lamination stack 22. The tension yokes 24 and the respective stacks 22 may be interconnected by bolts 22a (FIG. 4) which pass through the holes 26 and 27 of the yokes 24 and stacks 22.

In the system shown in FIG. 1, the side edge 28 of each yoke 24 extends beyond the respective annular winding 20 so that a cover 24 can be applied to these yokes and is held thereby away from the stator core stack 15 and the windings 20 carried thereby. The cover 29 is interlocked with the edges 28 and is connected mechanically with them.

Yokes 24 and the cover 29 are preferably made of electrically conductive material to form damping cages for each of the annular windings 20 disposed between each pair of yokes 24.

The magnetic flux emerging at the three surfaces of the stator core stack 15 which are enclosed in these damping cages, induces currents of opposite direction to the currents in coils 20 and these induced currents produced, in turn, an opposite magnetic flux in the comb lamination stacks 22 which is returned to the stator core 15 to increase electrical efficiency of the motor.

The damping cages formed by the yokes 24 and the cover 29 are connected together by longitudinal conductor bars 30 and 31 on each side of the motor. These bars along or with additional stiffening members (not shown) of the cover 29 form a load carrying structure for the motor and facilitate the connection thereof to the supports 2 and 3. Hence the latter may be connected directly to the cover 29 and to the conductor bar 31.

I claim:

1. A linear-induction motor comprising a flat reaction rail and a stator shiftable along said rail magnetically cooperating therewith, said stator comprising an elongated stator core including a stack of core laminations lying in planes parallel to the direction of movement of said stator transversely to the plane of said rail, a plurality of annular stator coils surrounding said stator core and spaced apart thereon in said direction, and a plurality of elongated comb lamination stacks lying against said stator core between said coils and juxtaposed with said reaction rail, said comb lamination stacks having lengths exceeding the width of said stator core in juxtaposition with said rail and being formed with laminations lying in planes perpendicular to said direction and to said rail, each of said comb lamination stacks having portions projecting laterally beyond said stator core, said motor further comprising a respective U-shaped tension yoke extending around said core and having free ends connected with said portions of the respective comb lamination stack.

2. The linear-induction motor defined in claim 1 wherein said yokes are broadened at said free ends to the dimensions of said portions of said comb lamination stacks, said free ends and the respective portions of the comb lamination stacks having contact surfaces inclined to the reaction rail.

3. The linear-induction motor defined in claim 2 wherein said surfaces have inclinations of about 45° to said reaction rail.

4. The linear-induction motor defined in claim 1 wherein said stator core is formed with transverse recesses between said coils open in the direction of said reaction rail and respectively receiving said comb lamination stacks.

5. The linear-induction motor defined in claim 1 wherein said comb lamination stacks have lengths at least 1.5 times the width of the stator core measured parallel to the comb lamination stacks.

6. The linear-induction motor defined in claim 1 wherein said yokes consist of metallic material and project outwardly beyond said coils, said motor further comprising a metallic cover extending in said direction and engaging said yokes outwardly of said coil, said yokes and said cover defining damping cages enclosing each coil disposed between two such yokes.

7. The linear-induction motor defined in claim 6, further comprising reinforcing means for said cover including a pair of longitudinal conductors flanking said yokes and electrically interconnecting said cages for mounting said stator upon a vehicle.

8. The linear-induction motor defined in claim 1 for an electromagnetically suspended vehicle having suspension and guide electromagnets, further comprising an armature rail magnetically cooperating with said electromagnets, said reaction rail being mounted on said armature rail.

9. A vehicle system comprising a track, a pair of armature rails extending along said track;
  a vehicle displaceable along said track and carrying respective electromagnets for suspending and guiding said vehicle on said track by magnetic cooperation with said armature rail;
  a flat ferromagnetic reaction rail secured to and extending along one of said armature rails;
  an elongated rectangular cross section stator core mounted on said vehicle and having a surface juxtaposed with said reaction rail and of a width less then the width of said reaction rail;
  a plurality of annular coils surrounding said stator core and spaced apart therealong in the direction of vehicle travel;
  a plurality of comb lamination stacks interdigitated with said coils and lying against said surface, said core lamination stacks having lengths substantially equal to the width of said reaction rail and exceeding the width of said surface, said core lamination stacks having ends projecing laterally beyond said stator core and being of rectangular cross section with laminations lying in planes perpendicular to said direction and to said reaction rail; and
  tension yokes between said coils extending around three sides of said stator core and having free ends secured to the ends of each comb lamination stack for retaining same against said surface, said stator core, said coils, said core lamination stack and said reaction rail forming a linear-induction motor for propelling said vehicle.

* * * * *